United States Patent [19]

Spinosa et al.

[11] 4,289,286

[45] Sep. 15, 1981

[54] REPLACEABLE HARNESS BRACKET ASSEMBLY

[75] Inventors: Dominic J. Spinosa, Wantagh; Frank Knoll, Huntington Station, both of N.Y.

[73] Assignee: East/West Industries, Inc., Farmingdale, N.Y.

[21] Appl. No.: 951,856

[22] Filed: Oct. 16, 1978

[51] Int. Cl.³ .............................................. B64D 25/00
[52] U.S. Cl. ............................... 244/1 R; 244/138 R; 244/122 B
[58] Field of Search ............... 244/138 R, 141, 151 R, 244/151 O, 151 B, 122 R, 122 B, 129.1; 24/31 R, 31 B, 73 PH, 201 R, 201 L, 201 LP, 211 R, 265 R, 265 AL; 297/464, 467, 468, 482, 485; 119/96; 224/275

[56] References Cited

U.S. PATENT DOCUMENTS

| | | | |
|---|---|---|---|
| 2,192,109 | 2/1940 | Smith | 244/151 R |
| 2,846,746 | 8/1958 | Webster et al. | 24/265 AL |
| 3,107,370 | 10/1963 | Gaylord | 244/151 A X |
| 3,884,436 | 5/1975 | Poehlmann | 244/151 A |

FOREIGN PATENT DOCUMENTS 844618  8/1960  United Kingdom

OTHER PUBLICATIONS

"Rocket Jet Survival Kit", *Western Aviation*, Apr. 1959, vol. 39, No. 4, p. 13.

*Primary Examiner*—Galen L. Barefoot
*Attorney, Agent, or Firm*—Leonard W. Suroff

[57] ABSTRACT

A disconnect device for an aircraft survival kit including a container and a lid secured thereto with a torso harness and anti-rotation strap associated therewith. The disconnect device includes a body adapted to be mounted relative to the kit, with the body including a recess, in accordance with one embodiment, adapted to enclose a portion of the kit therein, and a support assembly extending outwardly from the body and including a cavity adapted to receive an end of the harness therein. A locking device is provided and adapted to extend through the support assembly and the end of the harness to provide securement of the harness to the kit so as to obtain removal of the harness from the disconnect device for replacement thereof when the locking devise is disengaged such that the lid may remain secured to the container when the harness is replaced. The support assembly includes a pair of spaced apart arms integrally joined with the body and defining the cavity for receiving the end of the harness therebetween. An anti-rotation assembly is provided and adapted to be secured to the kit in fixed spaced relationship to the body for retaining the strap of the harness, and a securing unit for removing the anti-rotation assembly so as to permit removal of the strap when replacement of the harness is desired is also provided.

24 Claims, 10 Drawing Figures

REPLACEABLE HARNESS BRACKET ASSEMBLY

BACKGROUND OF THE INVENTION

The present invention relates to survival kits that are used in aircraft, and more particularly a manner of providing the replacement of the harness associated therewith when refurbishing thereof is required.

Survival kits have associated therewith a harness that is used by the pilot and/or navigator when a descent is made at the time ejection from the aircraft occurs. The harness adjusts to the torso of the man or woman, and a retrofit thereof is generally required from time to time. Replacement of the harness straps may generally occur every six to nine months in certain military-type aircraft.

Prior to the present invention it was necessary to open the survival kit each time replacement of the harness assembly was required. This jeopardized the integrity of the kit, which normally remains sealed to positively assure that there has been no tampering with the kit after it has been inspected and sealed. It can well be appreciated that the ability to provide the replacement of the harness without opening the kit, which necessitates a reinspection thereof, would provide a savings in time and money.

The inventors of the present invention, being fully appreciative of this fact, have now invented a new and novel universal replaceable harness adjustment that permits replacement of the harness with a minium of effort and without the necessity of having to first open the survival kit in order to remove certain brackets, which was the standard practice prior to the present invention.

The present invention permits field replacement of the harness in approximately fifteen minutes, as compared to approximately four hours prior to the present invention.

OBJECTS OF THE INVENTION

An object of the present invention is to provide a disconnect device for survival kits for the quick and positive connection and disconnection of the harness therefrom as required.

Another object of the present invention is to provide a disconnect device which permits replacement of the harness without the need for first opening the sealed survival kit, with a minimal effort and in a simple manner.

Other objects and advantages of the present invention will become apparent as the disclosure proceeds.

SUMMARY OF THE INVENTION

The present invention relates to a disconnect device for an aircraft survival kit including a container and a lid secured thereto with a torso harness and anti-rotation strap associated therewith. The disconnect device comprises, in accordance with one embodiment of the invention, a body adapted to be mounted relative to the kit, with the body including a recess adapted to enclose a portion of the kit therein, and support means extending outwardly from the body and including a cavity adapted to receive an end of the harness therein. The support means includes a pair of spaced apart arms integrally joined with the body and defining the cavity for receiving the end of the harness therebetween.

Locking means adapted to extend through the support means and the end of the harness to provide securement of the harness to the kit so as to obtain removal of the harness from the disconnect device for replacement thereof when the locking means is disengaged such that the lid may remain secured to the container when the harness is replaced is provided. The locking means includes a pair of socket holes extending through the support means, and a fastener extending through the arms and the end of the harness. The locking means may further include a locking element to removably retain the fastener in removable fixed position relative to the support means. The socket holes are in axial alignment with each other and angularly disposed relative to the body.

The support means includes a yoke extending between the arms, with the yoke including a front wall adapted to extend in spaced relationship to the end of the harness, and a pair of oppositely disposed side walls extending intermediate the arms and rearwardly from the front wall. The recess of the body includes a top panel, a first flange, a second flange, and the flanges each extending downwardly from the top panel and adapted to extend at one corner of the lid. The top panel and each one of the flanges are integrally joined together such that the body is adapted to receive one end of the survival kit in the recess.

There is also provided connecting means to rigidly secure the body to the kit. The connecting means includes at least one aperture in each one of the flanges such that a fastener may extend through each one of the flanges and in secured relation to the kit.

Anti-rotation means adapted to be coupled to the kit in fixed spaced relationship to the body for retaining the strap of the harness is provided with securing means for the anti-rotation means so as to permit removal of the strap when replacement of the harness is desired. The securing means permits removal of the anti-rotation means without removal of the lid of the kit. The body and the anti-rotation means are joined to the lid of the kit.

In accordance with another embodiment, coupling means operative with the body is provided such that the body is oscillatable relative to the kit. The coupling means includes a socket slit in the body and a post extending in fixed relationship to the kit and through the socket slit so as to permit angular displacement of the body relative to the kit.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE DRAWINGS

Figure 1:
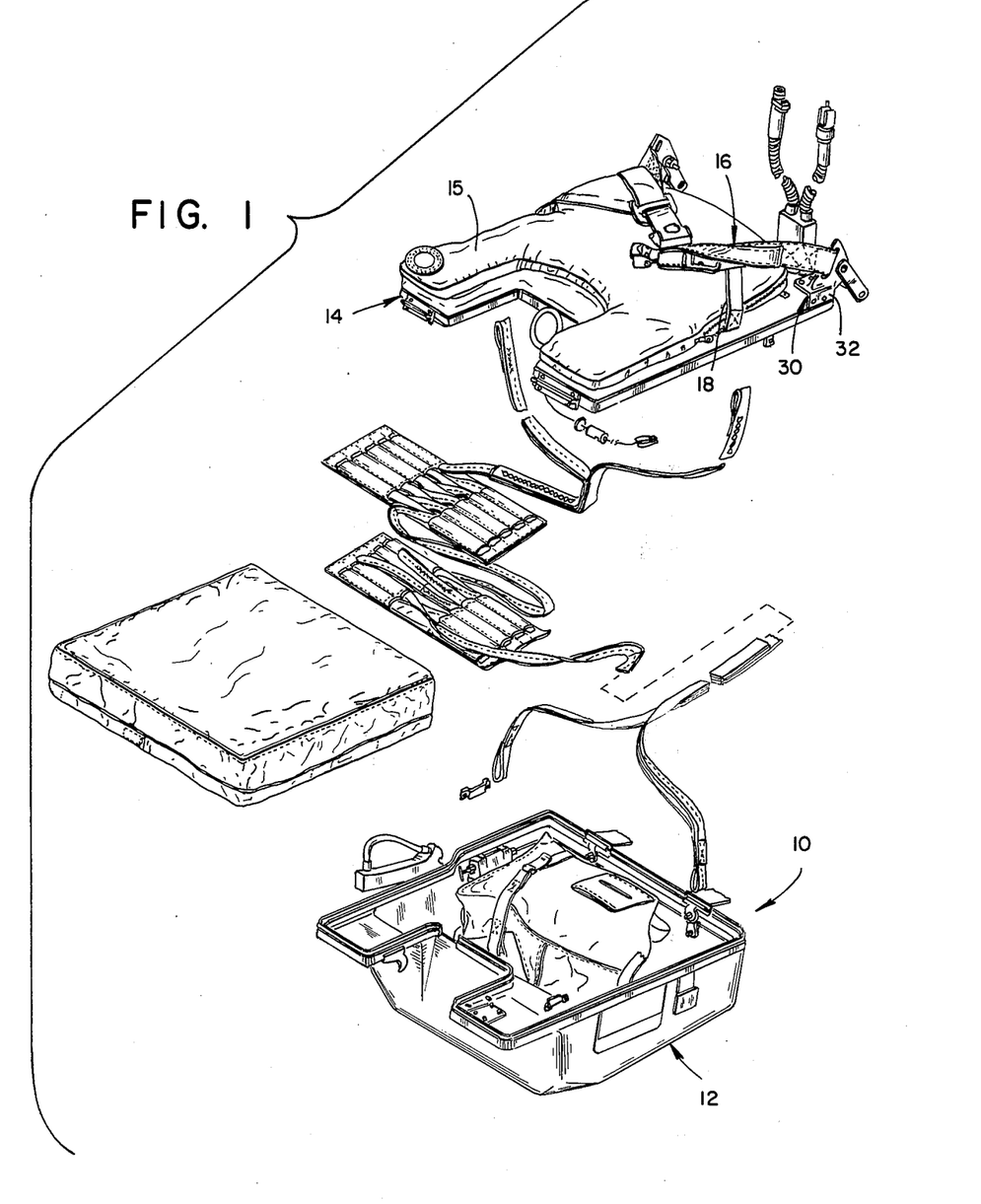
FIG. 1 is a perspective view of a conventional survival kit in exploded fashion illustrating the present invention with the disconnect device thereon.

Referring to the drawings, there is illustrated in FIGS. 1-7 one embodiment of the present invention. Each embodiment is to be utilized in conjunction with an aircraft survival kit 10 well known in the art and, as illustrated in FIG. 1, containing various equipment, life raft, etc., that is normally packaged therein in anticipation of the usage of the survival kit 10. The kit 10 includes a container 12 and a lid 14 that is normally secured thereto. The lid 14 may have a cushion 15 thereon. Under normal conditions the container and lid are sealed after inspection and would normally not thereafter be opened, except for usage, over a long period of time.

Associated with each kit 10 is normally a torso harness 16 which includes a pair of anti-rotation straps 18. The harness 16 normally is utilized by the aviator, or other passenger of the aircraft, in a well known manner.

The harness 16 includes spaced apart ends 20 having an aperture or opening 22 therethrough. In a similar manner each anti-rotation strap has a distal end 24 that similarly provides an opening 25. The general life span of the harness 16 and strap 18 may only be several months due to its continued usage, and thereafter replacement or refurbishing is required. Prior to the present invention the lid 14 had to be removed from the container 12 in order to obtain release of the free ends 20 and distal ends 24. This caused a considerable amount of time and money to be expended in view of the fact that the contents of the container 12 had to be reinspected and that a fixture is normally used in the initial assembly of the lid 14 and container 12 to obtain proper alignment therebetween. This necessitated return of the kit 10 to an area having the capability of performing this function.

The present invention now includes a disconnect device 30 which is associated with the lid 14 and, as illustrated in FIG. 1, the disconnect device 30 includes a body 32 adapted to be mounted at respective corners 34 of the lid 14. The body 32 includes a recess or seat 35 adapted to enclose the corner 34 of the kit 10. The body 32 may be fabricated from metallic material and include a top panel 36, a first flange 38 and a second flange 40. Flanges 38 and 40 each extend downwardly from the top panel 36 and at right angles to each other. The top panel 36 and each of the flanges 38 and 40 are integrally joined together and form the recess or seat 35 in order to accommodate the corner 34. A pair of bodies 32 are provided on the lid 14.

Connecting means 42 is utilized to rigidly secure the body 32 to the lid 14. As illustrated, the connecting means 42 may include apertures 44 extending through the top panel 36, the first flange 38, and second flange 40. There may be provided a permanently fixed nut 45 that is fixedly secured to the inner wall 46 of the lid 14. In this manner each of the screw-type fasteners 48 may extend through the flanges 38 and 40 or top panel 36 and be received in secured relation to the nut 45. In this manner both the fasteners 48 and the entire body 32 may be readily removed from the lid 14. If desired, as is generally preferable, the fasteners 48 and nuts 45 remain permanently secured to each other such that the end 20 may be removed when required in a manner hereinafter described.

Associated with each body 32 is support means 50 extending outwardly from the body 32 and including a cavity 52 adapted to receive a respective end 20 of the harness 16. The support means 50 includes a pair of spaced apart arms 54 which may be integrally joined with the body 32 and defining the cavity 52 by a pair of spaced apart edges 55 which receive the harness end 20 therebetween.

Figures 2, 3:
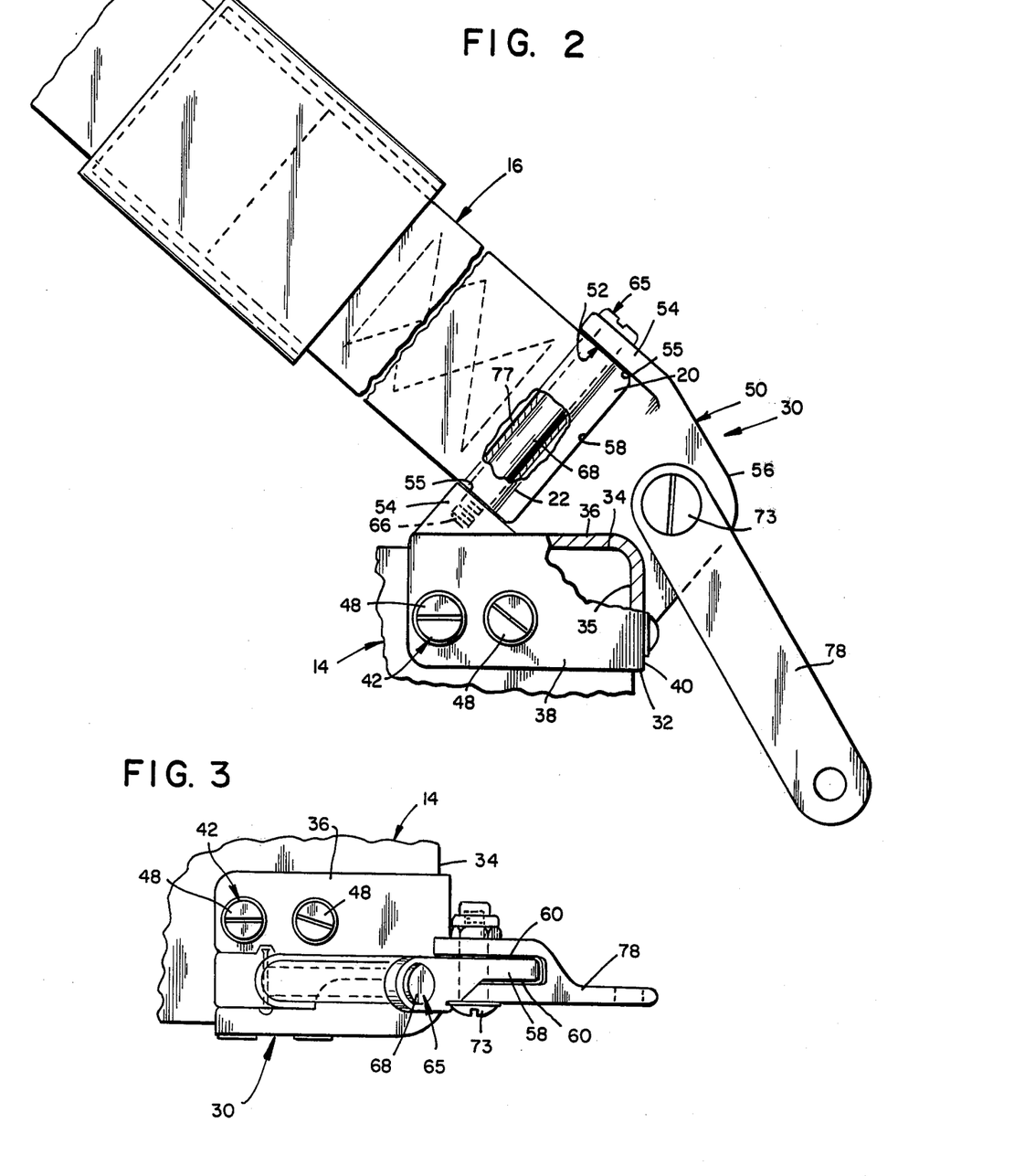
FIG. 2 is an enlarged side plan view of a corner of the cover of the survival kit with the disconnect device mounted thereon.
FIG. 3 is a top plan view of that illustrated in FIG. 2.
Figure 4:
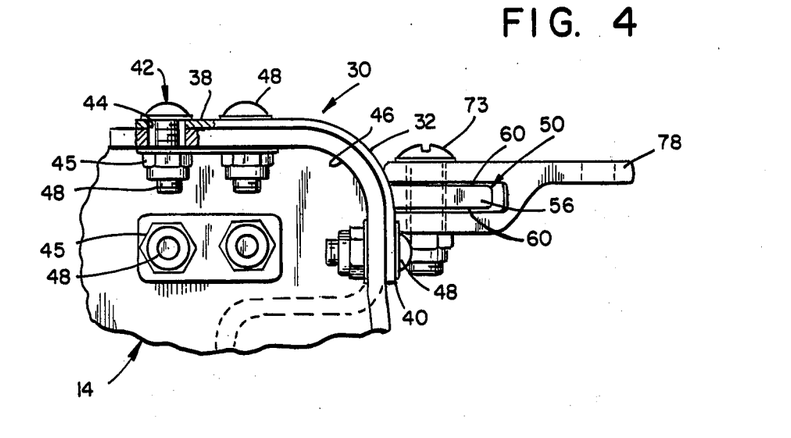
FIG. 4 is a bottom view partly in section illustrating the mounting of the disconnect device to the cover.
Figure 7:
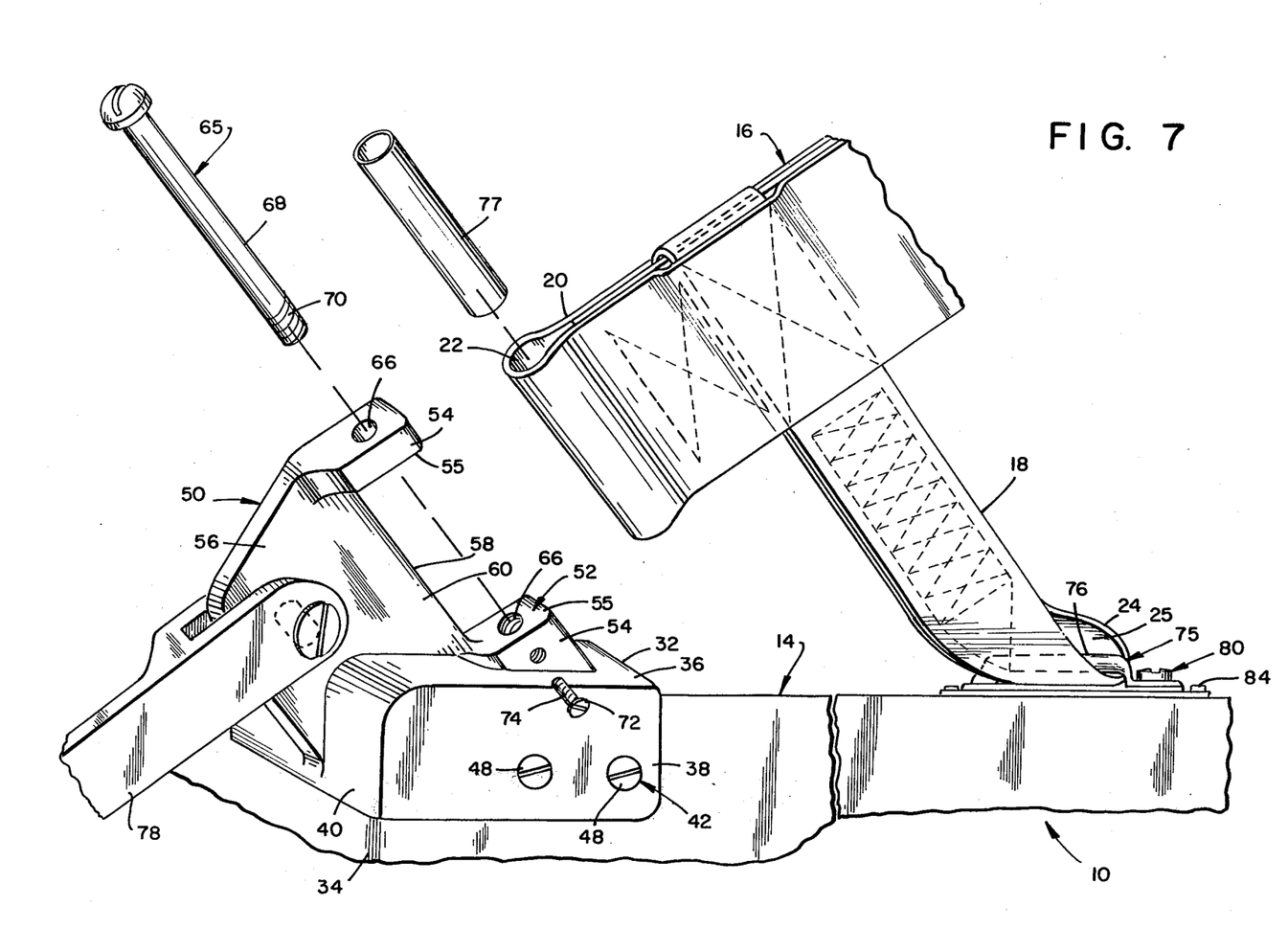
FIG. 7 is an exploded perspective view of the disconnect device as associated with the cover of the survival kit.

The support means 50 further includes a yoke 56 extending between the arms 54. The yoke 56 includes a front wall 58 adapted to extend in spaced relationship to the end 20 of the harness 16. A pair of oppositely disposed side walls 60 extend intermediate the arms 54 and rearwardly from the front wall 58. As illustrated in FIGS. 2 and 7, the yoke 56 may be thinner or narrower than the arms 54.

There is also provided locking means 65 adapted to extend through the support means 50 in order to provide removable securement of the harness 16 to the kit 10. In this manner replacement of the harness 16 may take place without the need to remove the lid 14 from its securement to the container 12. The locking means 65 may include a pair of socket holes 66 extending through the support means 50 and through each arm 54. A fastener 68 extends through the arms 54 and each socket hole 66. The fastener 68 extends through the opening 22 in the end 20 of the harness 16. The fastener 68 may be in the form of a screw having a threaded portion 70, as illustrated in FIG. 7.

In addition, to provide for further securement, a locking element 72 may be utilized to removably retain the fastener 68 in removably fixed position relative to the support means 50. As illustrated in FIG. 7, the locking element 72 may include a threaded fastener 74. The socket holes 66 are preferably in axial alignment with each other and angularly disposed relative to the top panel 36 of the body 32 as is customary. A lever 78 is provided, as illustrated in FIG. 7, and forms part of the total kit 10 and is secured by fastener 73 to the yoke 56 at one end and other end to a portion of the aircraft.

Figure 5:
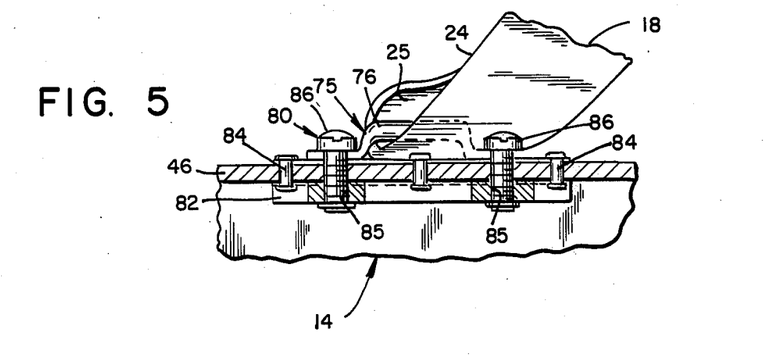
FIG. 5 is an enlarged view illustrating the portion of the disconnect device which prevents anti-rotation of the harness strap.
Figure 6:
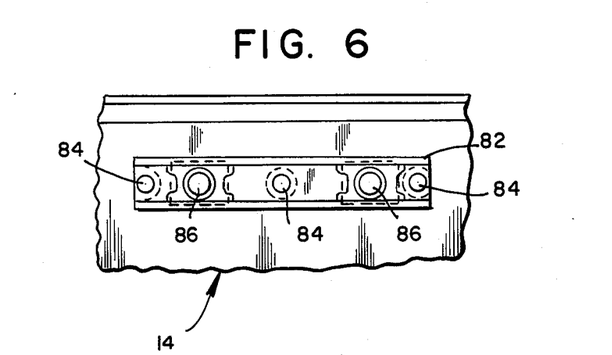
FIG. 6 is a bottom plan view of the device as illustrated in FIG. 5.

There is also provided anti-rotation means 75 adapted to be coupled to the lid 14 of the kit 10. The anti-rotation means may include a strap member 76 that is in fixed spaced relationship to the body 32. One anti-rotation means 75 is associated with each body 32. Securing means 80 is provided for permitting removal of the strap member 76. Strap member 76 extends through the opening 25 at the distal end 24 of the strap 18, as illustrated in FIGS. 5 and 7. A roller bearing 77, as illustrated in FIG. 2, may be mounted on the fastener 68 to facilitate friction reduction between the opening 25 and the fastener 68. The roller bearing 77 also increases load capability with the fastener 68 reacting to shear loads and the roller bearing 77 reacting to bending loads.

The securing means 80 may include a securement plate 82 that is fixedly secured as by rivets 84 to the wall 46 of the lid 14 and may provide a threaded aperture 85 through which the fasteners 86 extend. Removal of the fasteners 86 permits a quick removal of the strap member 76 when replacement of the strap 18 is required.

In view of the above, it can be appreciated that the locking means 65 and the anti-rotation means 75 may be readily removed in such a manner that the integrity of the kit 10 is maintained and that the harness 16 and strap 18 may be readily removed therefrom and a new harness 16 and strap 18 placed in position.

Figure 8:
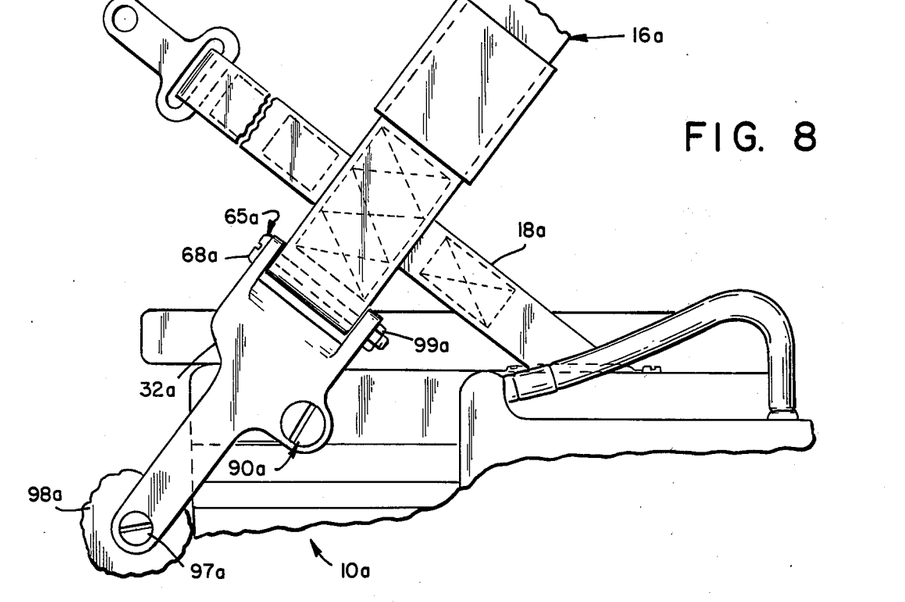
FIG. 8 is a view similar to FIG. 2 illustrating an alternate embodiment of the present invention.
Figure 9:
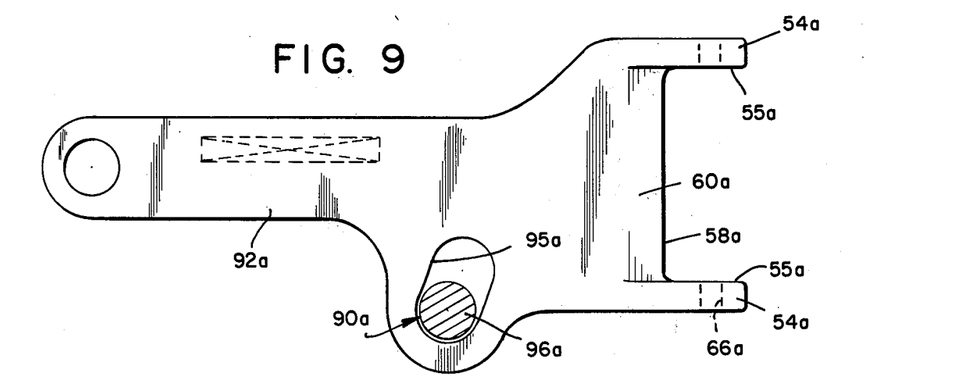
FIG. 9 is an enlarged view illustrating the mounting arrangement of the disconnect device.
Figure 10:
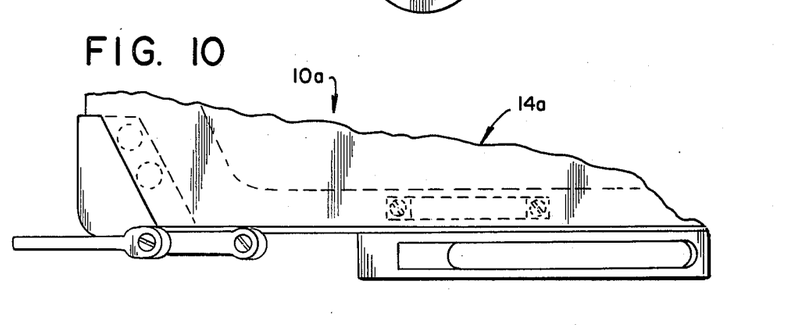
FIG. 10 is a top plan view of the disconnect device illustrated in FIG. 8.

In accordance with another embodiment of the present invention, as illustrated in FIGS. 8 through 10 inclusive, the kit 10a includes a body 32a that is not fixedly secured to the kit 10a but is supported by coupling means 90a. The coupling means 90a is such that the body 32a is oscillatable relative to the kit 10a. The body 32a has a rear end 92a, as illustrated in FIGS. 8 and 9, and the coupling means 90a is utilized. The coupling means 90a includes a socket slit 95a in the body 32a and a post 96a extending in fixed relationship to the kit 10a and through the socket slit 95a.

This permits angular displacement of the body 32a relative to the kit 10a as it relates to the fixed axis identified by fastener 97a which is secured to a portion of the aircraft 98a. This permits angular self alignment of the body 32a which aids in the adjustment of the harness 16a to torsos of various sizes, depending upon the user thereof. A nut 99a may be provided on the threaded portion 70a of fastener 68a.

In all other respects the embodiment of FIGS. 8 through 10 is similar to those portions illustrated and discussed with respect to FIGS. 1 through 7.

Although illustrative embodiments of the invention have been described in detail herein with reference to the accompanying drawings, it is to be understood that the invention is not limited to the precise embodiments, and that various changes and modifications may be effected therein without departing from the scope or spirit of the invention.

What is claimed is:

1. A disconnect device for an aircraft survival kit including a container and a lid secured thereto with a torso harness and anti-rotation strap associated therewith, said disconnect device comprising:
   A. a body adapted to be mounted relative to said kit,
   B. support means extending outwardly from said body and including a cavity adapted to receive an end of the harness therein,
   C. locking means adapted to extend through said support means and said end of the harness to provide securement of the harness to the kit so as to obtain removal of the harness from the disconnect device for replacement thereof when said locking means is disengaged such that the lid may remain secured to the container when the harness is replaced,
   D. said support means includes a pair of spaced apart arms integrally joined with said body and defining said cavity for receiving said end of the harness therebetween,
   E. said locking means includes a pair of socket holes extending through said support means, and a fastener extending through said arms and end of said harness,
   F. anti-rotation means adapted to be coupled to said kit in fixed spaced relationship to said body for retaining the strap of the harness,
   G. securing means for said anti-rotation means so as to permit removal of the strap when replacement of the harness is desired, and
   H. one pair of said body and said anti-rotation means is provided for each said kit.

2. The device defined in claim 1, wherein:
   a. said locking means further includes a locking element to removably retain said fastener in removable fixed position relative to said support means, and
   b. said socket holes are in axial alignment with each other and angularly disposed relative to said body.

3. The device defined in claim 1, wherein:
   a. said support means includes:
      (1) a yoke extending between said arms,
      (2) said yoke includes a front wall adapted to extend in spaced relationship to said end of the harness, and
      (3) a pair of oppositely disposed side walls extending intermediate said arms and rearwardly from said front wall, and
   b. said body has a recess which includes:
      (1) a top panel,
      (2) a first flange,
      (3) a second flange, and
      (4) said flanges each extend downwardly from said top panel.

4. A disconnect device for an aircraft survival kit including a container and a lid secured thereto with a torso harness and anti-rotation strap associated therewith, said disconnect device comprising:
   A. a body adapted to be mounted relative to said kit,
   B. said body including a recess adapted to enclose a portion of said kit therein,
   C. support means extending outwardly from said body and including a cavity adapted to receive an end of the harness therein,
   D. locking means adapted to extend through said support means and said end of the harness to provide securement of the harness to the kit so as to obtain removal of the harness from the disconnect device for replacement thereof when said locking means is disengaged such that the lid may remain secured to the container when the harness is replaced,
   E. said support means includes a pair of spaced apart arms integrally joined with said body and defining said cavity for receiving said end of the harness therebetween,
   F. said locking means includes:
      (1) a pair of socket holes extending through said support means and in axial alignment with each other and angularly disposed relative to said body,
      (2) a fastener extending through said arms and said end of said harness, and
      (3) a locking element to removably retain said fastener in removable fixed position relative to said support means,
   G. said socket holes are substantially in axial alignment with each other and angularly disposed relative to said body,
   H. said support means includes a yoke extending between said arms,
   I. said yoke includes a front wall adapted to extend in spaced relationship to said end of the harness, J. a pair of oppositely disposed side walls extending intermediate said arms and rearwardly from said front wall, K. said recess of said body includes:
(1) a top panel,
(2) a first flange,
(3) a second flange,
(4) said flanges each extending downwardly from said top panel,
(5) said top panel and each one of said flanges are integrally joined together such that said body is adapted to receive one end of said survival kit in said recess, and L. connecting means to rigidly secure said body to said kit, said connecting means including at least one aperture in each one of said flanges such that a fastener may extend through each one of said flanges and in secured relation to said kit.

5. The device defined in claim 4, including a lever pivotally coupled to said body.

6. A disconnect device for an aircraft survival kit including a container and a lid secured thereto with a torso harness and anti-rotation strap associated therewith, said disconnect device comprising:

A. a body adapted to be mounted relative to said kit,
B. said body including a recess adapted to enclose a portion of said kit therein,
C. support means extending outwardly from said body and including a cavity adapted to receive an end of the harness therein,
D. locking means adapted to extend through said support means and said end of the harness to provide securement of the harness to the kit so as to obtain removal of the harness from the disconnect device for replacement thereof when said locking means is disengaged such that the lid may remain secured to the container when the harness is replaced,
E. anti-rotation means adapted to be coupled to said kit in fixed spaced relationship to said body for retaining the strap of the harness, and
F. securing means for removing said anti-rotation means so as to permit removal of the strap when replacement of the harness is desired.

7. The device defined in claim 6, wherein said securing means permits removal of said anti-rotation means without removal of the lid of said kit.

8. The device defined in claim 7, wherein said body and said anti-rotation means are joined to the lid of said kit.

9. The device defined in claim 6, wherein said support means includes a pair of spaced apart arms integrally joined with said body and defining said cavity for receiving said end of the harness therebetween.

10. The device defined in claim 9, wherein said locking means includes:
a. a pair of socket holes extending through said support means, and
b. a fastener extending through said arms and said end of said harness.

11. The device defined in claim 10, wherein said locking means further includes a locking element to removably retain said fastener in removable fixed position relative to said support means.

12. The device defined in claim 10, wherein said socket holes are in axial alignment with each other and angularly disposed relative to said body.

13. The device defined in claim 11, wherein said locking element includes a fastener having a threaded portion.

14. The device defined in claim 9, wherein:
a. said support means includes a yoke extending between said arms,
b. said yoke includes a front wall adapted to extend in spaced relationship to said end of the harness, and
c. a pair of oppositely disposed side walls extending intermediate said arms and rearwardly from said front wall.

15. A disconnect device for an aircraft survival kit including a container and a lid secured thereto with a torso harness and anti-rotation strap associated therewith, said disconnect device comprising:

A. a body having a rear end, said rear end adapted to be pivotally mounted relative to said kit,
B. coupling means operative with said body such that said body is oscillatable relative to said kit,
C. support means extending outwardly from said body and including a cavity adapted to receive an end of the harness therein,
D. locking means adapted to extend through said support means and said end of the harness to provide securement of the harness to the kit so as to obtain removal of the harness from the disconnect device for replacement thereof when said locking means is disengaged such that the lid may remain secured to the container when the harness is replaced,
E. said coupling means includes a socket slit in said body and a post extending in fixed relationship to said kit and through said socket slit so as to permit angular displacement of said body relative to said kit,
F. anti-rotation means adapted to be coupled to the lid of said kit in fixed spaced relationship to said body for retaining the strap of the harness,
G. securing means for said anti-rotation means so as to permit removal of the strap when replacement of the harness is desired,
H. said securing means permits removal of said anti-rotation means without removal of the lid of said kit, and
I. said anti-rotation means includes a strap holder element connected to said kit.

16. The device defined in claim 15, wherein said support means includes a pair of spaced apart arms integrally joined with said body and defining said cavity for receiving said end of the harness therebetween.

17. The device defined in claim 16, wherein said locking means includes:
a. a pair of socket holes extending through said support means, and
b. a fastener extending through said arms and said end of said harness.

18. The device defined in claim 17, wherein said locking means further includes a locking element to removably retain said fastener in removable fixed position relative to said support means and said socket holes are in axial alignment with each other and angularly disposed relative to said body.

19. The device defined in claim 17, wherein said support means includes:
a. a yoke extending between said arms and joined to said rear end,
b. said yoke includes a front wall adapted to extend in spaced relationship to said end of the harness, and c. a pair of oppositely disposed side walls extending intermediate said arms and rearwardly from said front wall.

20. An aircraft survival kit comprising:
A. a container and a lid secured thereto with a torso harness and anti-rotation strap associated therewith,
B. a disconnect device to provide removal of the harness and anti-rotation strap from said kit so as to permit replacement thereof when required such that the lid may remain secured to the container when the harness and strap are replaced, said disconnect device comprising,
C. a body adapted to be mounted at two respective corners of the lid,
D. support means extending outwardly from each said body and including a cavity adapted to receive an end of the harness therein respectively,
E. locking means adapted to extend through said support means and each said end of the harness to provide securement of the harness to the kit,
F. said support means includes a pair of spaced apart arms integrally joined with said body and defining said cavity for receiving said end of the harness therebetween,
G. said locking means includes a pair of socket holes extending through said support means, and a fastener extending through said arms and said end of said harness,
H. anti-rotation means adapted to be coupled to the lid in fixed spaced relationship to each said body for retaining the strap of the harness, and
I. securing means for removing said anti-rotation means so as to permit removal of the strap when replacement of the harness is desired.

21. The kit defined in claim 20, wherein each said body includes:
a. a top panel,
b. a first flange,
c. a second flange, and
d. said flanges each extending downwardly from said top panel.

22. The kit defined in claim 21, wherein:
a. a yoke extends between said arms,
b. said yoke includes a front wall adapted to extend in spaced relationship to said end of the harness, and
c. a pair of oppositely disposed side walls extending intermediate said arms and rearwardly from said front wall.

23. The kit defined in claim 20, including coupling means operative with each said body such that said body is oscillatable relative to said kit.

24. The kit defined in claim 23, wherein said coupling means includes a socket slit in each said body and a post extending in fixed relationship to said kit and through each said socket slit so as to permit angular displacement of said body relative to said kit.

* * * * *